Oct. 13, 1964 S. KUGLER 3,152,589

LIQUID OXYGEN SYSTEM FOR PASSENGER AIRCRAFT

Filed April 15, 1960

SIMON KUGLER
Inventor

By Aaron R. Townshend
Attorney

United States Patent Office
3,152,589
Patented Oct. 13, 1964

3,152,589

LIQUID OXYGEN SYSTEM FOR PASSENGER AIRCRAFT

Simon Kugler, Cockfosters, England, assignor to The British Oxygen Company Limited, a British company
Filed Apr. 15, 1960, Ser. No. 22,505
Claims priority, application Great Britain, Apr. 16, 1959, 12,953/59
1 Claim. (Cl. 128—186)

This invention relates to a liquid oxygen system for passenger aircraft, that is to say a system for supplying oxygen to breathing equipment intended for use by persons aboard a passenger aircraft, in which the source of oxygen in the aircraft consists of one or more containers in which oxygen is stored in liquefied form.

In a liquid oxygen system, the container is referred to as a converter and is heat-insulated, and liquid oxygen is drawn from the converter according to demand and is converted into consumable gaseous form in the converter system, usually by employing an evaporating coil or coils. The converter system incorporates various valves, for filling, pressure build-up, pressure control and flow regulation, and so forth.

According to the present invention, in a liquid oxygen system for a passenger aircraft, separate supply lines from a common stored source of liquid oxygen are provided for separate breathing equipment intended for use by the passengers and by the crew of the aircraft respectively, and valve means are provided for cutting off the supply to the passenger equipment without cutting off the supply to the crew equipment.

The valve means may be operable manually, or may be operated automatically to cut off the supply to the passenger equipment when the quantity of liquid oxygen remaining in the stored source reaches a predetermined low quantity. In this latter connection, a gauging mechanism for constantly detecting and indicating the quantity of liquid oxygen in the stored source may be adapted to effect automatic closure of the valve means when a predetermined low quantity of liquid oxygen is detected by the gauging mechanism.

Embodiments of the invention will now be described with reference to the accompanying drawings, in which.

Figure 1:
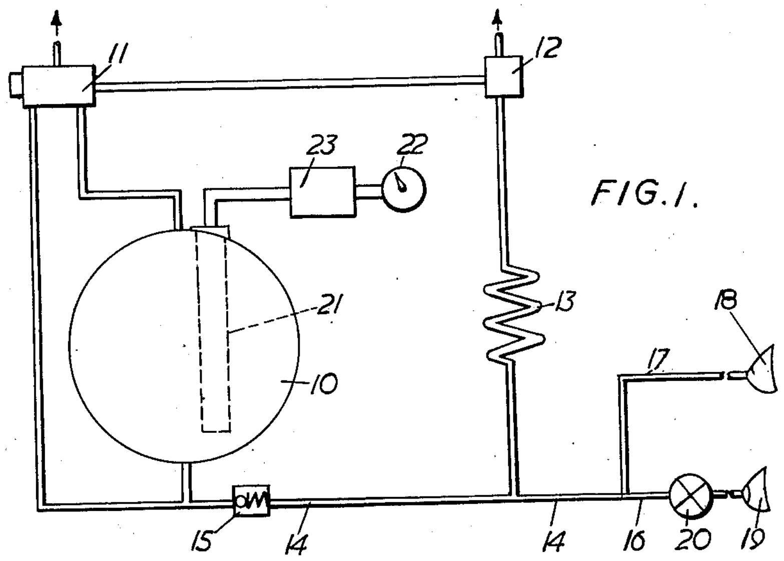
FIG. 1 is a schematic diagram depiciting a liquid oxygen supply system for a passenger aircraft, having a manual control valve for cutting off the supply to passenger equipment.

Referring to FIG. 1 of the drawings, a liquid oxygen supply system for a passenger aircraft comprises a converter vessel 10 of suitable size (e.g. 25 litres), together with a vent and filler valve 11, a combined pressure build-up and pressure relief valve 12, a pressure build-up vaporising coil 13, and associated flow conduits for these elements whereby the converter is operative to establish a flow of oxygen in a common supply line 14 extending from the base of the converter vessel 10 via a check valve 15. The system so far described incorporates no feature forming part of the present invention, and thus far could be said to be conventional and well-known to those skilled in the art.

The common supply line 14 from the converter vessel 10 branches into two separate supply lines 16 and 17 respectively, the line 17 going to breathing equipment intended for use by the aircrew, as depicted by a breathing mask 18, while the line 16 goes to equipment intended for use of the passengers, as depicted by a breathing mask 19. Thus when the breathing equipment is in general use during flight of the aircraft, both the crew and the passengers are consuming oxygen drawn from the converter vessel 10. Those skilled in the art will appreciate that it would be customary to provide vaporiser coils for the liquid oxygen in the delivery lines 14, 16 or 17, but such coils are not depicted in FIG. 1.

An an/off valve 20 is provided in the supply line 16, so that the supply of oxygen to the passengers can be cut off by closing the valve 20, the intention being that if the quantity of liquid oxygen in the converter vessel 10 reaches a predetermined low level, the remaining quantity should constitute a reserve of oxygen for use by the crew only since the safety of the aircraft may depend upon the crew having an adequate supply of oxygen.

In FIG. 1 the valve 20 is manually operated, so that a member of the crew can close the valve when it is observed that the stored source of liquid oxygen in the converter vessel 10 has reached a predetermined low quantity, and in this connection a gauging mechanism associated with the converter vessel 10 may be arranged to give a visual or audible indication that the contents of the converter vessel 10 have been depleted to the predetermined low quantity. A conventional form of electrical capacitance gauging mechanism for this purpose is indicated in FIG. 1, in which an electrical condenser probe unit 21 is shown depending into the converter vessel 10, and is connected to a dial gauge indicator 22 via gauge unit 23.

Figure 2:
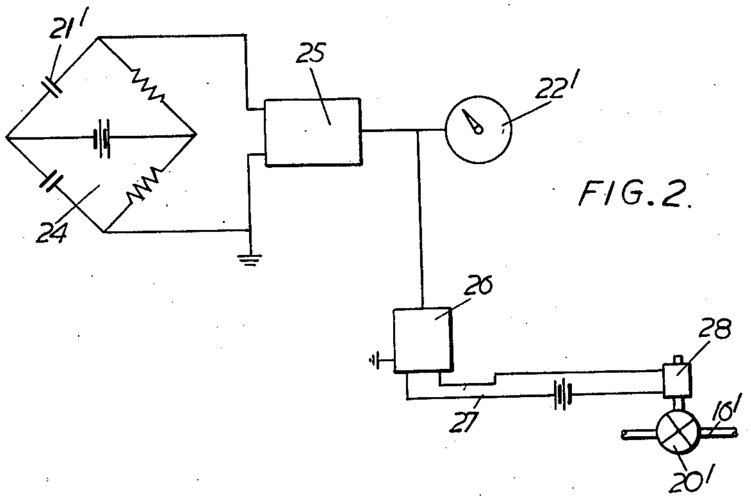
FIG. 2 is an electrical circuit diagram, showing one method of providing for automatic closing of the control valve seen in FIG. 1.

FIG. 2 depicts an electrical system for effecting automatic closing of the valve 20 of FIG. 1, shown again at 20' in FIG. 2, when the contents of the converter vessel 10 reach the predetermined low quantity at which the valve 20 should shut off the oxygen supply to the passengers. In FIG. 2 a condenser probe, similar to the unit 21 of FIG. 1, is indicated graphically at 21' as included in a bridge circuit 24. When a converter vessel with which the condenser 21' is associated is empty, the bridge circuit 24 is arranged to be in balance, but when said vessel is filled with liquid oxygen the capacity of the probe condenser 21' is increased due to the dielectric characteristics of the liquid oxygen. The bridge 24 is therefore unbalanced by an amount which indicates a measure of the contents of the converter vessel which the condenser 21' is sensing, and an electrical signal is derived of strength proportional to the volume of liquid in the converter vessel. The strength of the signal is increased by an amplifier unit indicated at 25 and operates a calibrated dial gauge 22'. The signal is also fed to a relay device 26 which operates when the signal strength falls to a predetermined value to close a secondary electrical circuit 27 to energise an electrical actuator 28, for example a solenoid, for closing the on-off valve 20' in the passenger supply line 16'.

It will be appreciated that FIG. 2 and the description thereof give only one practical example of means for automatically closing the on-off valve in the passenger supply line, and that other means may be employed to produce the same result.

What I claim is:

In an oxygen supply system for an aircraft for selectively supplying oxygen in the gaseous state to passengers and aircrew from a common source of liquid oxygen within the aircraft, the combination comprising a converter vessel for converting said oxygen from a liquid to a gaseous state, means interconnecting said oxygen supply and said converter for conducting said liquid oxygen into said converter, conduit means connected to said converter and extending outwardly therefrom for conducting a supply of gaseous oxygen away from said converter, first and second supply lines connected to said conduit, first and second oxygen dispensing breathing means connected to said first and second supply lines respectively, condition responsive valve means in said first supply line between said conduit and said first breathing means, said valve being normally open and movable between open and closed positions for selectively delivering a supply of oxygen to said first breathing means in accordance with variations in the liquid oxygen supply conditions, sensing means connected to said liquid oxygen supply for determining the quantity of the same, and actuating means for said valve connected to said sensing means for moving said valve from its normally open position to the closed position to prevent delivery of oxygen to said first breathing means upon sensing of a predetermined condition by said sensing means.

References Cited in the file of this patent

UNITED STATES PATENTS

| | | |
|---|---|---|
| 2,302,023 | Glasser | Nov. 17, 1942 |
| 2,830,580 | Saklad et al. | Apr. 15, 1958 |
| 2,934,293 | Boehme et al. | Apr. 26, 1960 |
| 2,943,401 | Eisenberg | July 5, 1960 |
| 3,016,061 | Maddock | Jan. 9, 1962 |